US007377430B2

(12) United States Patent
Fleischman

(10) Patent No.: US 7,377,430 B2
(45) Date of Patent: May 27, 2008

(54) SYSTEM FOR SECURE AND ACCURATE ELECTRONIC VOTING

(75) Inventor: Thomas J. Fleischman, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 10/908,930

(22) Filed: Jun. 1, 2005

(65) Prior Publication Data

US 2006/0273169 A1 Dec. 7, 2006

(51) Int. Cl.
*G06K 7/00* (2006.01)

(52) U.S. Cl. ....................................... 235/386; 235/375

(58) Field of Classification Search ................ 235/386, 235/375

See application file for complete search history.

(56) References Cited

U.S. PATENT DOCUMENTS

2003/0006282 A1 1/2003 Vadura et al.
2005/0263593 A1* 12/2005 Collins, Jr. ................. 235/386

OTHER PUBLICATIONS

Analysis of an Electronic Voting System, by Tadayoshi Kohno, Adam Stubblefield, Aviel D. Rubin and Dan S. Wallach published Feb. 27, 2004, copyright the IEEE, appears in IEEE Symposium on Security and Privacy 2004. IEEE Computer Society Press, May 2004. Previously appeared as John Hopkins University Information Security Institute Technical Report TR-2003-19, Jul. 23, 2003.

* cited by examiner

*Primary Examiner*—Karl D. Frech
(74) *Attorney, Agent, or Firm*—Rosa S. Yaghmour; Howard M. Cohn

(57) ABSTRACT

Performing electronic voting by utilizing the ATM network and ATM machines; issuing voter cards to voters; modifying existing ATM software to recognize the voter card; maintaining a voter registration database; and making the voter registration database available to the ATM network. In use, the voter is matched to the database, and to voting options, and is restricted options specified by the database. A voting record, such as record, photo and verification, is stored in the database. A paper receipt is issued to the voter for verification.

15 Claims, 3 Drawing Sheets

SECURE ATM NETWORK

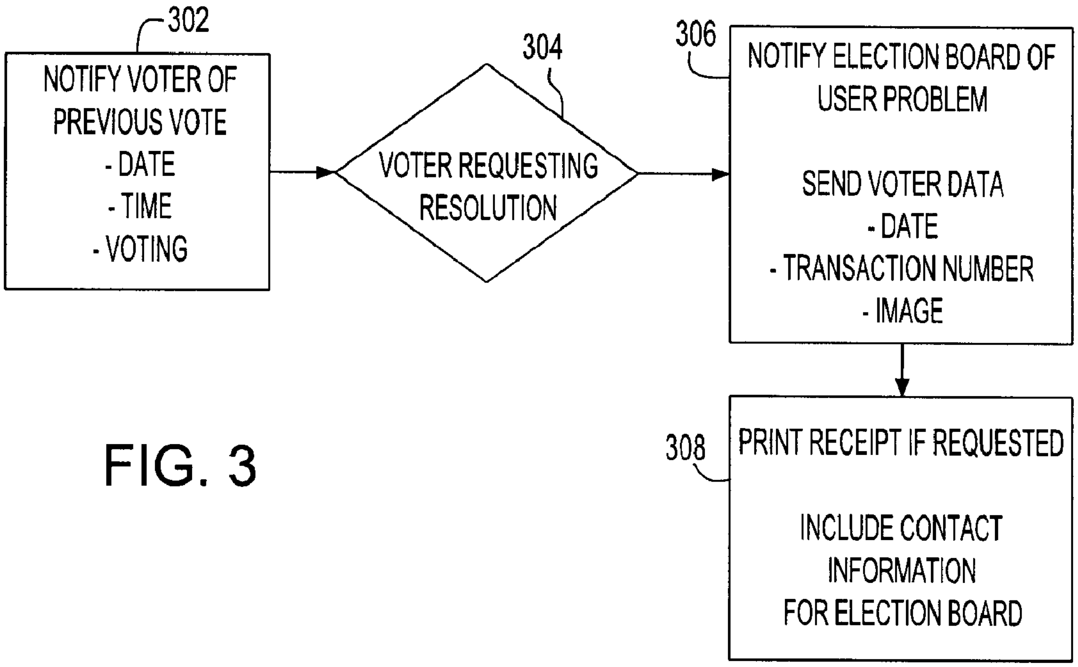
FIG. 3
FIG. 5
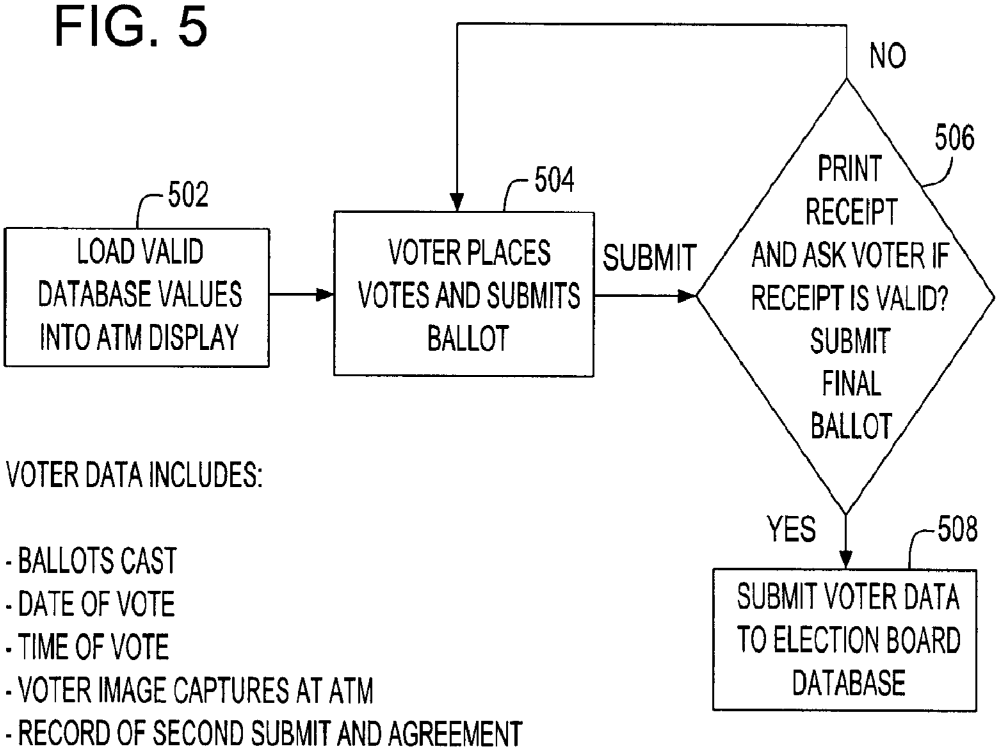

SYSTEM FOR SECURE AND ACCURATE ELECTRONIC VOTING

BACKGROUND OF THE INVENTION

The present invention relates to method and apparatus for electronic voting.

As it has been apparent observing recent events, the voting process in the United States is non-standardized, full of flaws and subject to possible errors and vote tampering. The recent (2004) election showed many possible solutions, some electronic, but even the electronic voting method was felt to be non-secure and flawed. Other methods such as paper, machines, etc., also result in many votes not being properly counted or the actual tally (and possible challenges) could take a very long time.

Another flaw in the system is the concern of people voting multiple times, of Deceased Voting (dead or non-existent people voting), of Unregistered/Unqualified Voters voting, etc. This is mainly a result of the local voting personnel using archaic methods for verifying the voter. Various techniques are used, but it is relatively easy to fake ID or possibly vote in multiple locations.

Other issues such as absentee ballots, receipts verifying electronic votes, etc, confuse the issue even further.

The article "Analysis of an Electronic Voting System", by Kohno et al., IEEE Symposium on Security and Privacy 2004. IEEE Computer Society Press, May 2004 (This paper previously appeared as Johns Hopkins University Information Security Institute Technical Report TR-2003-19, Jul. 23, 2003) (hereinafter, "IEEE Article") describes an electronic voting system.

Elections allow the populace to choose their representatives and express their preferences for how they will be governed. Naturally, the integrity of the election process is fundamental to the integrity of democracy itself. The election system must be sufficiently robust to withstand a variety of fraudulent behaviors and must be sufficiently transparent and comprehensible that voters and candidates can accept the results of an election. Unsurprisingly, history is littered with examples of elections being manipulated in order to influence their outcome. (source, IEEE Article)

The design of a "good" voting system, whether electronic or using traditional paper ballots or mechanical devices, must satisfy a number of sometimes competing criteria. The anonymity of a voter's ballot must be preserved, both to guarantee the voter's safety when voting against a malevolent candidate, and to guarantee that voters have no evidence that proves which candidates received their votes. The existence of such evidence would allow votes to be purchased by a candidate. The voting system must also be tamper-resistant to thwart a wide range of attacks, including ballot stuffing by voters and incorrect tallying by insiders. (source, IEEE Article)

As a result of the Florida 2000 presidential election, the inadequacies of widely-used punch card voting systems have become well understood by the general population. Despite the opposition of computer scientists, this has led to increasingly widespread adoption of "direct recording electronic" (DRE) voting systems. DRE systems, generally speaking, completely eliminate paper ballots from the voting process. As with traditional elections, voters go to their home precinct and prove that they are allowed to vote there, perhaps by presenting an ID card, although some states allow voters to cast votes without any identification at all. After this, the voter is typically given a PIN, a smartcard, or some other token that allows them to approach a voting terminal, enter the token, and then vote for their candidates of choice. When the voter's selection is complete, DRE systems will typically present a summary of the voter's selections, giving them a final chance to make changes. Subsequent to this, the ballot is "cast" and the voter is free to leave. (source, IEEE Article)

The most fundamental problem with such a voting system is that the entire election hinges on the correctness, robustness, and security of the software within the voting terminal. Should that code have security-relevant flaws, they might be exploitable either by unscrupulous voters or by malicious insiders. Such insiders include election officials, the developers of the voting system, and the developers of the embedded operating system on which the voting system runs. If any party introduces flaws into the voting system software or takes advantage of pre-existing flaws, then the results of the election cannot be assured to accurately reflect the votes legally cast by the voters. (source, IEEE Article)

Currently the most viable solution for securing electronic voting machines is to introduce a "voter-verifiable audit trail". A DRE system with a printer attachment, or even a traditional optical scan system (e.g., one where a voter fills in a printed bubble next to their chosen candidates), will satisfy this requirement by having a piece of paper for voters to read and verify that their intent is correct reflected. This paper is stored in ballot boxes and is considered to be the primary record of a voter's intent. If, for some reason, the printed paper has some kind of error, it is considered to be a "spoiled ballot" and can be mechanically destroyed, giving the voter the chance to vote again. As a result, the correctness of any voting software no longer matters; either a voting terminal prints correct ballots or it is taken out of service. If there is any discrepancy in the vote tally, the paper ballots will be available to be recounted, either mechanically or by hand. (A verifiable audit trail does not, by itself, address voter privacy concerns, ballot stuffing, or numerous other attacks on elections.) (source, IEEE Article)

The IEEE Article analyzes the Diebold AccuVote-TS 4.3.1 electronic voting system and found significant security flaws: voters can trivially cast multiple ballots with no built-in traceability, administrative functions can be performed by regular voters, and the threats posed by insiders such as poll workers, software developers, and janitors is even greater.

US Patent Publication No. 20030006282 discloses systems and methods for electronic voting. An electronic voting system has a voting administrative module connected to a plurality of voting modules connected via a network. A voter initiates the voting process by inserting a voting key into a voting key reader of a voting module. The voter then makes voting selections, which include casting votes, on a touch screen display of the voting module. Alternatively, the voting module may verbally guide the voter through the voting process using an audio headphone. The voter may also make voting selections verbally through a microphone using voice recognition technology, or by using a tactile keypad. After the voter is finished casting votes, a voter verifiable paper ballot is printed and an electronic ballot is saved on the electronic voting system. The voter can review the paper ballot. If the voter is not satisfied with the voting selections reflected on the paper ballot, then the paper ballot and the electronic ballot may be spoiled and the voter given a new voting key to use to re-cast the votes on the electronic voting system.

SUMMARY OF THE INVENTION

It is an object of the invention to provide an electronic voting system which is secure from hacking, reliable and fast.

According to the invention, a method of performing electronic voting comprises: utilizing the ATM network and ATM machines; issuing voter cards to voters; modifying existing ATM software to recognize the voter card; maintaining a voter registration database; and making the voter registration database available to the ATM network. In use, the voter is matched to the database, and to voting options, and is restricted options specified by the database. A voting record, such as record, photo and verification, is stored in the database. A paper receipt is issued to the voter for verification.

According to the invention, a method of electronic voting, comprises: utilizing an ATM network, including ATM machines; maintaining an election database comprising voting options; maintaining a voter database comprising a list of authorized voters; and allowing a voter to interact with an ATM machine. The method may further comprise determining whether the user wants to perform a banking transaction or a voting transaction; prompting the user to enter a passcode; verifying the packed, determining whether the user has already voted and, if the user has not already voted, initiating a vote module; if the user has already voted, notifying the voter and initiating a vote resolution module. The method may further comprise notifying the voter of his previous vote, including information such as the date, and time, and voting selections; asking the voter whether he requests resolution of the problem; and notifying the Election Board of the problem. The method may further comprise asking the voter whether he wants a receipt of the voting transaction to be printed. The method may further comprise presenting the voter with a provisional ballot for voting; and counting the vote when the problem is resolved. The method may further comprise loading valid database values into the ATM machine; allowing the voter to make vote selections; and providing means for the voter to submit his ballot when he is done voting. The method may further comprise printing a receipt of the voting transaction. The method may further comprise questioning the voter whether the receipt is valid, and if the voter responds in the affirmative, submitting the voting transaction to the Election Board; and if the voter responds in the negative, starting the voting process over again. The method may further comprise if the voting process is started over again, providing modified voting menus having default values which reflect the voter's previous attempt at voting.

According to the invention, a system for secure and accurate electronic voting comprises: the ATM network; voter cards issued to voters; means for recognizing the voter card; a voter registration database; and means for making the voter registration database available to the ATM network. The system may further comprise means for matching the voter to the database, and to voting options; means for restricting the voter to options specified by the database; and means for storing a voting record in the database.

The IEEE Article describes a stand alone system, which is inherently prone to attack/hacking/error.

The present invention describes using the current ATM Banking Network, protocol and system. The ATM Network has proven to be secure to hacking, reliable and fast.

US Patent Publication No. 20030006282 describes a standalone system with all the problems, flaws and limitations inherent therein. A similarity with the present invention is that the ballot is printed for the voter as a record, and the system asks voter for verification. A difference is that the present invention piggybacks on all of the excellent security and other functional features of the ATM Network, not the least of which is that it allows for voting from anywhere there is an ATM.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

FIGS. 2-5 are flowcharts illustrating how the system of FIG. 1 functions, according to the invention.

DETAILED DESCRIPTION OF THE INVENTION

Figure 1:
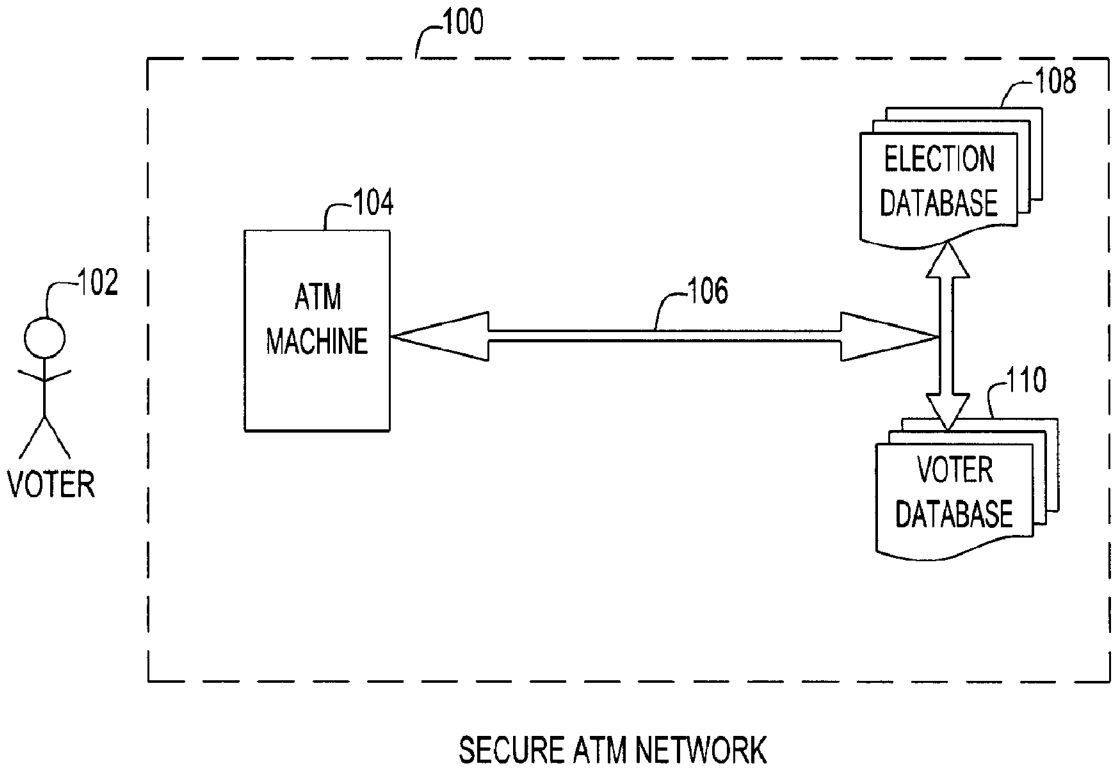
FIG. 1 is a diagram illustrating a voting system, according to the invention.

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

According to the invention, generally, an electronic voting system uses what is possibly the world's most secure electronic infrastructure—the ATM network.

The ATM network used in the banking system today is possibly the world's most secure and accurate publicly used computer system. It is tamper proof, extremely accurate, extremely fast and shares information between banks, accounts, etc. It is accessible from all over the world.

The existing ATM network is ideal for purposes of voting because it provides User Verification, Instant Access, Receipts, Secure Access, and Verified Access.

Currently, for banking transactions, the user utilizes a bank card or a credit card to activate the system, enters the account using a PIN number (password) and can deposit, withdraw or check balances of the accounts the user/card combination has access to, in most cases regardless of what bank or where the user is located.

All transactions are documented, verified electronically, receipts are given out, and in most cases photos are taken of the user for future reference should a discrepancy occur.

According to the invention, a voting (voter registration) card, similar to a bank card and possibly a replacement for a Social Security Card be issued to all registered voters. Or, to all American citizens with a social security number. For purposes of this description, it is assumed that the information on the card be the social security number only. However, other data (address, birth date, etc) can be included, but is not necessary. The card could also serve as a social security card, and mimics an ATM card. The card can have various information encrypted/coded on it.

At election time, the people responsible for the election—be it local, regional, nation election of a person or passing of a referendum—will document the voting slots and options. At Election Time, Regional, State and National Voting Data is Entered into a Database which is accessible by the ATM Network. This includes:

National, State and Local Referendums

Registered Voter List

Voter Status (have they voted yet?)

For example, in 2004 there was a national presidential election. However, each candidate needed to be placed on the ballot in each state. (Ralph Nader was not on the ballot in all states. If a voter registered in a state with Nader on ballot, it is a vote option.) There were also local elections (senators, judges, etc.) and referendums (same sex marriage, stadium funding, etc.). This information will be entered into a database and made available to the banking systems.

The banking systems will place an option on their ATM for voting.

The voter will then be able to step up to any ATM Machine, enter their card and PIN number. Once validated, the information stored on the card will identify the options available to them (i.e., the voting options available to them, including local, State and Federal).

Assuming that all is correct, the user can then place their votes, receiving a paper receipt for their verification. The ATM can then ask the user to verify the paper receipt to what is on the screen, an additional method to verify accuracy. Once verified by the voter, the data is sent to the proper election board for tallying.

If the card had been used to vote previously (at another ATM, etc), then the screen would identify to the user that the card has already voted. A software flag can be issued, retracing and identifying the previous vote and passing the information on to the election committee for resolution (picture verification, etc.).

FIG. 1 is a diagram illustrating, at a high level, the overall system of the invention. The system 100 is based on the secure ATM network 100, already in existence and functioning. Generally, a Voter 102 interacts at an ATM Machine 104 which is connected via a network 106 (the ATM network) to an Election Database 108 and a Voter Database 110. The two databases 108,110 are maintained by the Election Board.

Figure 2:
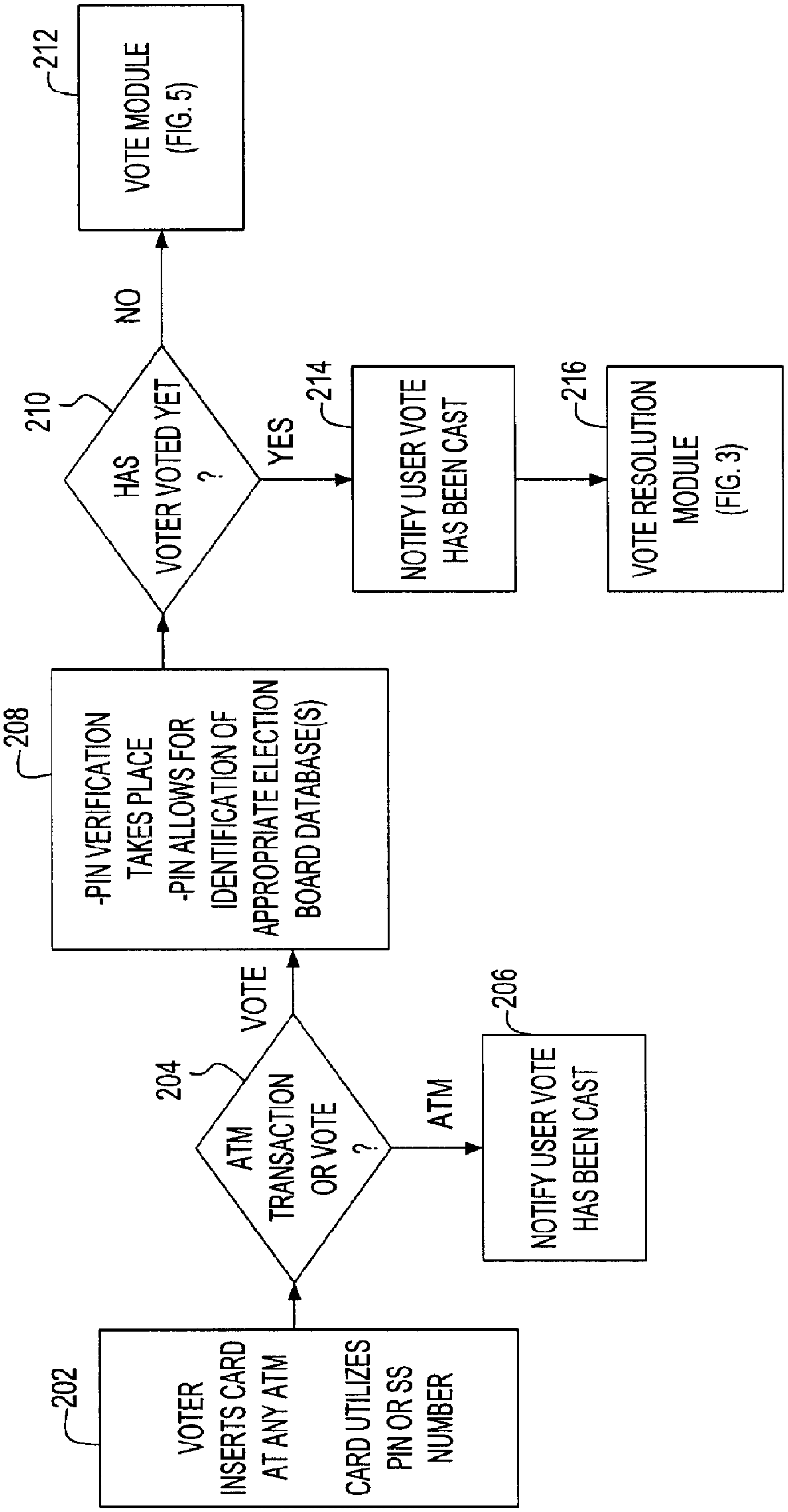

FIG. 2 is is a flowchart illustrating, in greater detail, how the system works. In a first step 202, the voter (user) inserts a card into any election-capable ATM machine. In a step 204, it is determined by the ATM machine whether the card is a standard bank card, or a voting card—in other words, whether the user is going to make a banking transaction, or cast a vote (make a voting transaction). If the card is a normal bank card, standard ATM processing proceeds at step 206, and needs no further description herein. If the card is a voting card, the voting process is initiated, at step 208. Alternatively, if the card is a multi-purpose card (capable of banking and voting), the user/voter is presented with a menu (on the display of the ATM machine) to choose between banking and voting. A voting card suitably is encrypted with a PIN number or the user's social security number. As used herein, the "voting card" can be a USB (universal serial bus) fob, it can incorporate a RFID (radio freqauency identification) access token/chip, fingerprint, retinal scan, voice recognition, etc. As used herein, the "voting card" is intended to embrace all existing portable identity modules such as are used for physical or virtual access control.

At the step 208, the voter is prompted to enter a PIN number (passcode) for verification, PIN number verification takes place, and the proper election board database(s) are identified. Next, in the step 210, it is determined whether the voter has voted yet. If the voter has not already voted, a Vote Module (see FIG. 5) is initiated, step 212. If the voter has already voted, the voter is presented, step 214, with an appropriate message indicating that he has already cast a vote and cannot vote again and a Vote Resolution Module (See FIG. 3) is initiated.

FIG. 3 is is a flowchart illustrating how the Vote Resultion Module of the invention works. In a first step 302, the voter is notified of his previous vote, including information such as the date, and time, and previous voting selections. Next, in step 304, the voter is prompted (asked) whether he requests resolution of the problem. The user may select "yes". Whether or not the voter requests resolution, in the next step 306 the Election Board is notified of the problem. The following data is sent to the Election Board—date, transaction number, and an image of the voter. Exceptions are handled on individual basis. The voter is prompted (asked), step 310, as to whether he desires a receipt of the transaction to be printed. The receipt can include contact information (e.g., telephone number) for the election board.

The Vote Resolution Module (FIG. 3) is for dealing with problems such as the voter has already voted and is attempting to vote again. Of course, there could be other problems, as well as system glitches requiring resolution. Therefore, alternatively, the voter can be notified (see step 214) that there that there is a problem that needs resolution, and can be presented with a "provisional" ballot (which would look just like a regular ballot) so that he can vote, and his vote will be counted if and when the problem is resolved. This would require a provisional vote module identical to the vote module of FIG. 5 (described below) with the addition of a flag indicating the status of the vote as "provisional" (responsive to a potential problem).

Figure 4:
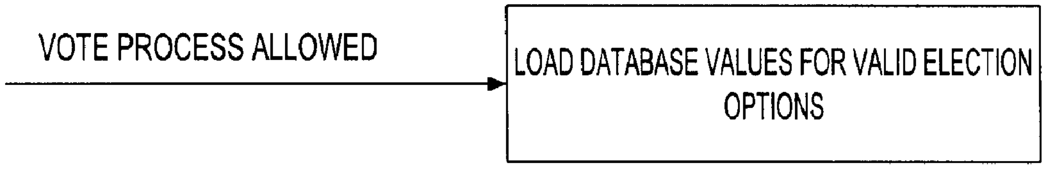

FIG. 4 is a flowchart illustrating the Election Board Database of the invention. If the vote process is allowed, database values for valid election options are loaded to the ATM machine so that the voter can vote. Next the Vote Module (FIG. 5) is initiated.

FIG. 5 is a flowchart illustrating the Vote Module of the invention. In a first step 502, valid database values are loaded into the ATM machine 104, for display (at appropriate intervals during the online voting process). In the next step 504, the voter places his votes, then at the end of making his selections (there may be a sequence of screens in a menu-driven process) submits his ballot (aggregate of selections), e.g., by pressing "enter" or "OK" in response to a query "Would you like to submit your vote?". The whole process can be menu-driven, including allowing going back, or restarting, or exiting, and the like. But, at the end, the voter must make a clear, unambiguous indication that he wants his vote(s) submitted, with no "touch-backs". This, of course, is comparable and similar to paradigm used for ATM banking transactions. The user has a certain amount of flexibility, until the final point when he is "done".

Next, in a step 506, a receipt is printed (i.e., a paper record of the voting transaction) and the user is questioned whether the receipt is valid. The user can respond either "yes" or "no".

If the user responds "yes", in a step 508 the voter's data (identification, vote(s), etc.—i.e., the complete voting transaction) is submitted to the Election Board database(s).

If the user responds in the negative to the step 506, the vote is not submitted and the voter is directed back to the step 504 to start voting, all over again. This can be a complete "fresh start", or the user can be presented with modified voting menus having default values which reflect his previous attempt (at step 504) in voting, such as with prompts such as "verify" or "change", and appropriate submenus to deal with the situation.

It is well within the purview of one of ordinary skill in the art to which the present invention pertains to create appropriate software to implement the invention, as described hereinabove. It is also intended that modifications to the above are included, such as having voice annunciators, secure ID systems (so called "fingerprinting", or iris recognition, in addition to password (PIN) protection), and the like. The menus can be implemented in various languages, and the like, as is common in many computing environments. The invention is a computerized voting system, and can benefit from the myriad various other computerized transaction and security systems which are already in place, without diluting the invention.

The invention utilizes the ATM Network and Machines to replace Voting Booths. A voter card is issued. Existing ATM software is modified to recognize the voter card. A voter registration database is maintained and made available to the ATM network. The ATM matches the voter to the database, and to voting options. The voter can only vote on options specified by the database. A voting record is stored in the database, including record, photo and verification. A paper receipt is given to the voter, and the voter is asked to verify the receipt.

The invention utilizes a proven, nationwide, secure network which is already in existence. The methodology disclosed herein prevents voter fraud while minimizing errors.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. Method of performing electronic voting comprising:
utilizing an ATM network, including ATM machines;
issuing voter cards to voters;
modifying existing ATM software to recognize the voter card;
maintaining a voter registration database;
making the voter registration database available to the ATM network;
matching the voter to the voter registration database, and to voting options; and
storing a voting record in the database.

2. The method of claim 1, further comprising:
restricting the voter to options specified by the database.

3. The method of claim 1, wherein the voting record comprises at least one of:
record, photo and verification.

4. The method of claim 1, further comprising:
giving a paper receipt to the voter.

5. The method of claim 4, further comprising:
asking the voter to verify the receipt.

6. Method of electronic voting, comprising:
utilizing an ATM network, including ATM machines;
maintaining an election database comprising voting options;
maintaining a voter registration database comprising a list of authorized voters; and
allowing a voter to interact with an ATM machine;
determining whether the user wants to perform a banking transaction or a voting transaction;
prompting the user to enter a passcode;
verifying the passcode,
determining whether the user has already voted; and,
if the user has not already voted, initiating a vote module, and
if the user has already voted, notifying the voter and initiating a vote resolution module.

7. The method of claim 6, further comprising:
notifying the voter of his previous vote, including information such as the date, and time, and voting selections;
asking the voter whether he requests resolution of the problem; and
notifying the Election Board of the problem.

8. The method of claim 7, further comprising:
asking the voter whether he wants a receipt of the voting transaction to be printed.

9. The method of claim 7, further comprising:
presenting the voter with a provisional ballot for voting; and
counting the vote when the problem is resolved.

10. The method of claim 6, further comprising:
loading valid database values into the ATM machine;
allowing the voter to make vote selections; and
providing means for the voter to submit his ballot when he is clone voting.

11. The method of claim 10, further comprising:
printing a receipt of the voting transaction.

12. The method of claim 11, further comprising:
questioning the voter whether the receipt is valid; and,
if the voter responds in the affirmative, submitting the voting transaction to the Election Board; and
if the voter responds in the negative, starting the voting process over again.

13. The method of claim 12, further comprising:
if the voting process is started over again, providing modified voting menus having default values which reflect the voter's previous attempt at voting.

14. A system for secure and accurate electronic voting comprising:
an ATM network;
voter cards issued to voters;
means for recognizing the voter card;
a voter registration database;
means for making the voter registration database available to the ATM network;
means for matching the voter to the registration database, and to voting options; and
means for storing a voting record in the registration database.

15. The system of claim 14, further comprising:
means for restricting the voter to options specified by the registration database.

* * * * *